Figure 1:
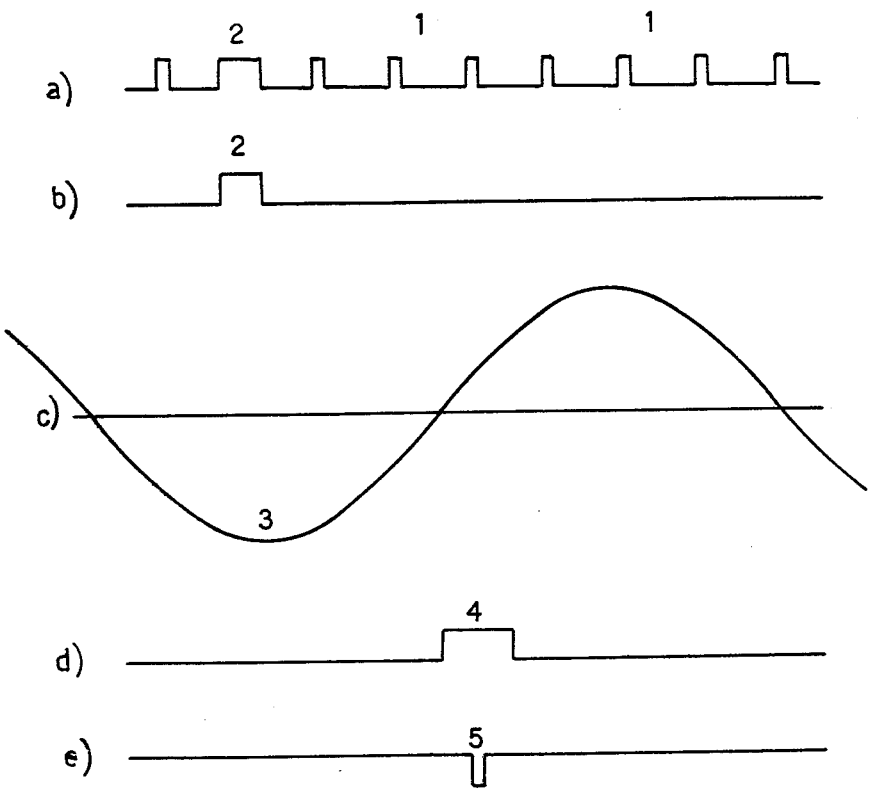

Aug. 16, 1955  E. KLEISSL  2,715,679
AUTOMATIC PHASE CORRECTOR
Filed May 18, 1951  2 Sheets-Sheet 1

Aug. 16, 1955 E. KLEISSL 2,715,679
AUTOMATIC PHASE CORRECTOR
Filed May 18, 1951 2 Sheets-Sheet 2

INVENTOR
ERBERTO KLEISSL
BY:
Nasseline, Lake-Co.
AGENTS

United States Patent Office 2,715,679
Patented Aug. 16, 1955

2,715,679

AUTOMATIC PHASE CORRECTOR

Erberto Kleissl, Milan, Italy, assignor to Fabrica Italiana Magneti Marelli Societa per Azioni, Milan, Italy, a firm Application May 18, 1951, Serial No. 227,020

Claims priority, application Italy May 22, 1950

4 Claims. (Cl. 250—27)

The present invention relates to a device for transforming a succession of electric pulses having a frequency $f$ into another succession of pulses having a frequency $f$ or $nf$, which with respect to the pulses of the first succession keep an exact and predetermined position and remain unvaried despite large variations of the electric constants of the circuit traversed by the pulses.

As is known from communication techniques, in pulse transmission the information from each of a number of channels may be transmitted by means of an information or channel pulse which according to the system selected may be modulated in amplitude, duration or position.

Further, to obtain at the different reception channels of a receiver the selection of the proper information pulses, there is also transmitted a pulse called a "synchronism pulse," which can be easily separated from the information pulses and which serves as a basis for properly distributing the information pulses in the receiver.

When separated in the receiver from the channel pulses, the synchronism pulse is amplified and sent to a filter. At the output of the filter there results a sinusoidal wave which is conveniently phase shifted with resistor-capacitor elements to provide a signal for each individual channel. As many sinusoids are provided as there are channels, each sinusoid being delayed by $1/n$ cycles, $n$ being the number of channels.

Each of these sinusoids selects its proper channel as next explained. Selection is accomplished for example, by means of a squaring circuit that triggers a multi-vibrator at the instant at which the voltage of a sinusoid passes from its negative range of values to the positive range of values. A pulse is thus obtained which is applied to the grid of a tube while to another grid of the same tube a train of information pulses is applied. The grids of this tube are biassed in such a manner as to allow plate current only if pulses are present on both grids simultaneously and thus the pulse of a desired channel can be selected.

It is evident that for proper selection the sinusoid has to have a rigid time relationship to the synchronism pulse.

Unfortunately, the filter at the output of which the sinusoid is generated must have a very narrow band width in order to avoid diaphony and background noise. Therefore, it is very difficult in practice to provide a filter meeting the requirements of phase stability and which also provides a strong attenuation of the undesired frequencies which are outside of the pass-band. It is accordingly an object of the present invention to eliminate those difficulties and to preserve the phasing of the sinusoid with accuracy. Moreover, the present invention also provides apparatus for the correction of the timing of the output signals of the channel multi-vibrators, which errors are due to variations of supply voltages and to values of the sinusoidal voltage. In other words, a corrector of the present invention directly compares the phase of the synchronism pulse with the phase of the pulse produced by a multi-vibrator of a channel selected as a reference.

Figure 3:
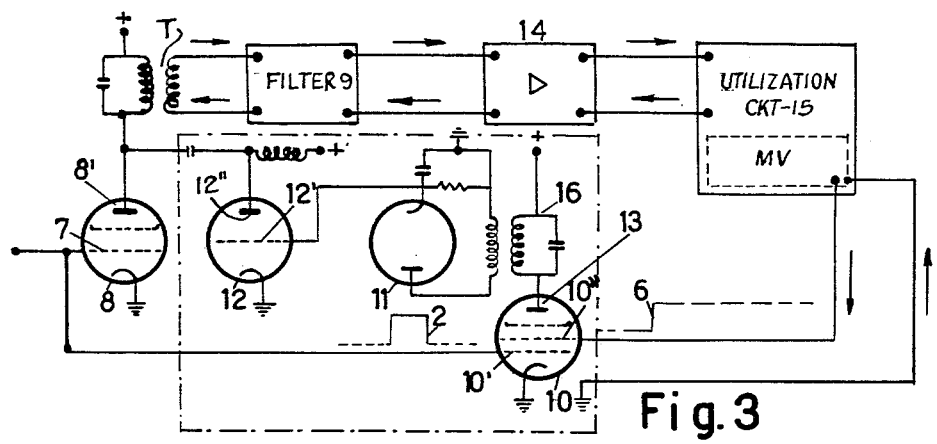
Figure 2:
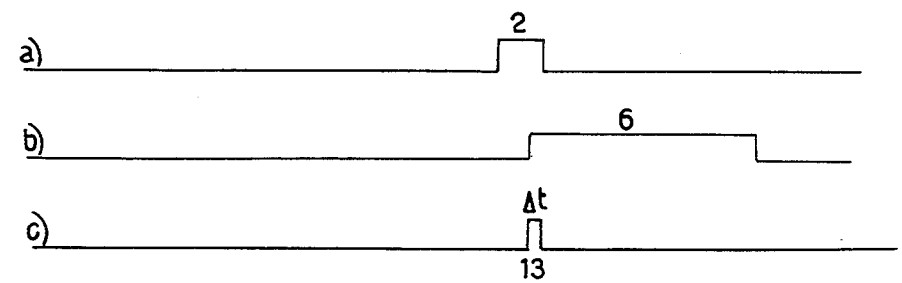

The operation of the present invention and its characteristics will be better explained with reference to the accompanying drawings wherein:

Fig. 1, with diagrams (a), (b), (c), (d) and (e), represents typical signals of a telephonic multiplex system utilizing pulse modulation;

Fig. 2, with diagrams (a), (b), (c) and (d), represents signals which occur during operation of apparatus of the present invention;

Fig. 3 represents the schematic diagram of a phase corrector circuit in accordance with the present invention.

The operation of the present invention will next be described by way of example for a pulse transmission system but it is evident that the same principle is also valid for other systems. Fig. 1a shows the pulses 1 which arrive at an eight-channel multiplex receiver. Besides the eight pulses 1, the synchronism pulse 2 having a longer duration is also received. The synchronism pulse 2 is separated from the other pulses 1 (Fig. 1b), amplified and sent to a filter 9 at the output of which there is produced (Fig. 1c) a sinusoid 3. The sinusoid 3 is then phase shifted in order to provide a wave for each individual channel. Each of these waves is thereafter transformed by way of a squaring circuit into a pulse 4 (Fig. 1d), which is applied to the grid of a tube, while to another grid of the same tube there is applied the succession of all the pulses 1. The squaring circuit may be such as described in Radio Engineer's Handbook, F. E. Terman, first edition, tenth impression, page 970 in section 33. The bias value of the two grids is selected to yield a plate current in the tube only if pulses are present on both grids simultaneously. In this way, the pulse of the desired channel 5 is the only pulse which results from the pulses 1. In Fig. 3 it will be seen that a phase correcting device of the present invention essentially comprises a tube 10 having two or more grids, a rectifier device 11, which may be a diode or a crystal rectifier, and a reactance tube 12.

Fig. 2a shows the synchronism pulse separated from the other pulses. Fig. 2b shows the pulse 6 of the reference channel, which must be accurately positioned in time with respect to the synchronism pulse 2.

In Fig. 2d is shown the sinusoid 3 generated by the pulse 2 on passing through the filter 9.

In known circuits, the pulse 2 applied to the grid 7 of the tube 8 serves to generate at the plate 8' a current pulse. In the plate circuit of the tube 8 is included a transformer T which transfers the current pulse to the filter 9 which may consist of two coupled resonant circuits and which has the function of supplying the very pure sinusoid 3. A suitable filter 9 is a transformer having its primary and secondary windings paralleled by capacitors. In order that the sinusoid 3 be very pure it is necessary for the filter 9 to have a very narrow band width and, consequently, a large variation of phase will result from both small variations of the signal frequencies and small variations of the tuning frequency of the filter 9. The filter 9 may also consist of a quartz crystal circuit.

In order to avoid such phase variations of the sinusoid 3, the phase corrector is in the circuit, as represented in Fig. 3.

The pulses 2 and 6 are sent respectively to the two grids 10' and 10'' of the tube 10, which are biassed in such a manner as to allow plate current only if the two pulses 2 and 6 are present simultaneously. The pulse 6 may be generated by a circuit such as described in section 33, page 970 of Radio Engineer's Handbook as cited above. The plate current pulse is fed to a resonant circuit 16 the voltage of which is rectified at the diode 11 and applied to the grid 12' of the reactance tube 12. If the superimposition (overlapping) of the two pulses 2 and 6 increases, evidently the duration Δt of the plate pulse 13 increases (Fig. 2c) and, therefore, the voltage rectified at the diode 11 also increases; this causes, by means of the reactance tube 12, a phase delay so that the pulse 6 (Fig. 2b) is displaced to the left reducing the duration Δt. For a decrease of the duration Δt, the opposite effect is achieved.

If during the starting period the pulse 6 (Fig. 2b) is shifted to the right, the tube 10 does not conduct, and as consequently there is no voltage rectified at the diode 11 bringing the pulse back to the right position.

If during starting the pulse 6 is shifted to the left, the plate current of the tube 10 is maximum, and the current, rectified at the diode 11, is sent to the reactance tube 12, which displaces the pulse toward the position of normal operation.

The accuracy obtainable with this device is very high because the duration Δt can be made very small. It is also possible to insert an A. C. amplifier between the tube 10 and the diode 11 to improve the result achieved. Thus a small percent variation of Δt can suffice to make up for the phase shift introduced by the tuned filter 9 and associated circuits.

What has been described relates to utilization apparatus of the pulse type. If the utilization apparatus is not of the pulse type, how to generate a suitable pulse for actuating the corrector will be apparent to those skilled in the art. In fact, if the utilized wave is sinusoidal, a circuit known as a multivibrator can be used to supply a pulse for the automatic phase corrector. If the wave in the utilization apparatus 15 is not sinusoidal, then the front of the wave shape may still be utilized to actuate a one-shot multi-vibrator. Such a multi-vibrator will furnish a pulse for operating the phase corrector.

There will now be, obvious to those skilled in the art, many modifications and variations utilizing the principles set forth and realizing many or all of the objects and advantages of the apparatus described but which do not depart essentially from the spirit of the invention.

What I claim is:

1. In an apparatus for receiving a succession of time modulated pulses made up of a plurality of information pulses and a synchronizing impulse, and which includes a reception channel, first means connected to the reception channel for separating the synchronizing impulse and transforming it into a plurality of sinusoids equal in number to the number of information pulses, and second means connected to the first means for maintaining the sinusoids in phase with the synchronizing impulse comprising electrical means including a transformer for transforming the incoming synchronizing impulse into a current impulse, a filter for converting the current impulse into a pure sinusoid, and a squaring circuit and a multivibrator for converting the sinusoid into a derived impulse with a steep wave front: an automatic phase corrector comprising, in combination, an electronic discharge device having at least a first grid connected to the reception channel for receiving the incoming signals, a second grid connected to the multivibrator for receiving the derived impulse and a plate circuit, a rectifier connected at one side to the plate circuit, and an electronic reactance device connected between the other side of the rectifier and the transformer.

2. In an apparatus for receiving a succession of time modulated pulses made up of a plurality of information pulses and a synchronizing impulse, and which includes a reception channel, first means connected to the reception channel for separating the synchronizing impulse and transforming it into a plurality of sinusoids equal in number to the number of information pulses, and second means connected to the first means for maintaining the sinusoids in phase with the synchronizing impulse comprising electrical means including a transformer for transforming the incoming synchronizing impulse into a current impulse, a filter for converting the current impulse into a pure sinusoid, and a squaring circuit and a multivibrator for converting the sinusoid into a derived impulse with a steep wave front: an automatic phase corrector comprising, in combination, an electronic discharge device having at least a first grid connected to the reception channel for receiving the incoming signals, a second grid connected to the multivibrator for receiving the derived impulse, and an anode, a resonant circuit connected to the said anode for receiving a resultant current impulse only when the incoming signals and derived impulse coincide in time, the duration of the resultant impulse being equal to the duration of coincidence in time of the incoming signals and derived impulse, a diode rectifier connected at one side to the plate circuit, and an electronic reactance tube having a control electrode connected to the other side of the rectifier and an anode coupled to the filter.

3. In an apparatus for receiving a succession of time modulated pulses made up of a plurality of information pulses and a synchronizing impulse, and which includes a reception channel, first means connected to the reception channel for separating the synchronizing impulse and transforming it into a plurality of sinusoids equal in number to the number of information pulses, and second means connected to the first means for maintaining the sinusoids in phase with the synchronizing impulse comprising electrical means including a transformer for transforming the incoming synchronizing impulse into a current impulse, a filter for converting the current impulse into a pure sinusoid, and a squaring circuit and a multivibrator for converting the sinusoid into a derived impulse with a steep wave front: an automatic phase corrector comprising, in combination, an electronic discharge device having at least a first grid connected to the reception channel for receiving the incoming signals, a second grid connected to the multivibrator for receiving the derived impulse, and an anode, a resonant circuit connected to said anode for receiving a resultant current impulse only when the incoming signals and derived impulse coincide in time, the duration of the resultant impulse being equal to the duration of coincidence in time of the incoming signals and derived impulse, a rectifier connected at one side to the plate circuit, and an electronic reactance tube having a control electrode connected to the other side of the rectifier and an anode connected to the filter.

4. An automatic phase corrector operative with a source of input signals comprising an electronic discharge device having at least a first grid for receiving incoming signals, a second grid for receiving a square-wave signal derived from the incoming signal, and a plate circuit; a rectifier connected at one side to said plate circuit; and an electronic reactance device connected between the other side of the rectifier and the source of input signals for adjusting the phase relationship between the incoming signal and the square wave signal.

References Cited in the file of this patent
UNITED STATES PATENTS

| | | |
|---|---|---|
| 2,466,044 | Schoenfield | Apr. 5, 1949 |
| 2,514,148 | Von Baeyer | July 4, 1950 |